2 Sheets—Sheet 1.

J. H. HELM.
MACHINES FOR WELDING CHAIN-LINKS.

No. 193,608. Patented July 31, 1877.

Witnesses
A. C. Johnston
James L. Johnston

Inventor
J. Henry Helm

J. H. HELM.
MACHINES FOR WELDING CHAIN-LINKS.

No. 193,608. Patented July 31, 1877.

Witnesses
A. C. Johnston
James Johnston

Inventor
J. Henry Helm

N. PETERS, PHOTO-LITHOGRAPHER, WASHINGTON, D. C.

UNITED STATES PATENT OFFICE.

J. HENRY HELM, OF ALLEGHENY, PENNSYLVANIA.

IMPROVEMENT IN MACHINES FOR WELDING CHAIN-LINKS.

Specification forming part of Letters Patent No. 193,608, dated July 31, 1877; application filed June 2, 1876.

*To all whom it may concern:*

Be it known that I, J. HENRY HELM, of Allegheny, in the county of Allegheny and State of Pennsylvania, have invented a new and useful Improvement in Link-Welding Machines; and I do hereby declare that the following is a full and exact description thereof, reference being had to the accompanying drawings, and to the letters of reference marked thereon.

My invention relates to an improvement in machines for welding chain-links; and it consists in combining the dies for welding the links with the hammer-arm of the machine, and the treadle and spring for operating the same.

To enable others skilled in the art to make and use my invention, I will proceed to describe its construction and operation.

Figure 1:
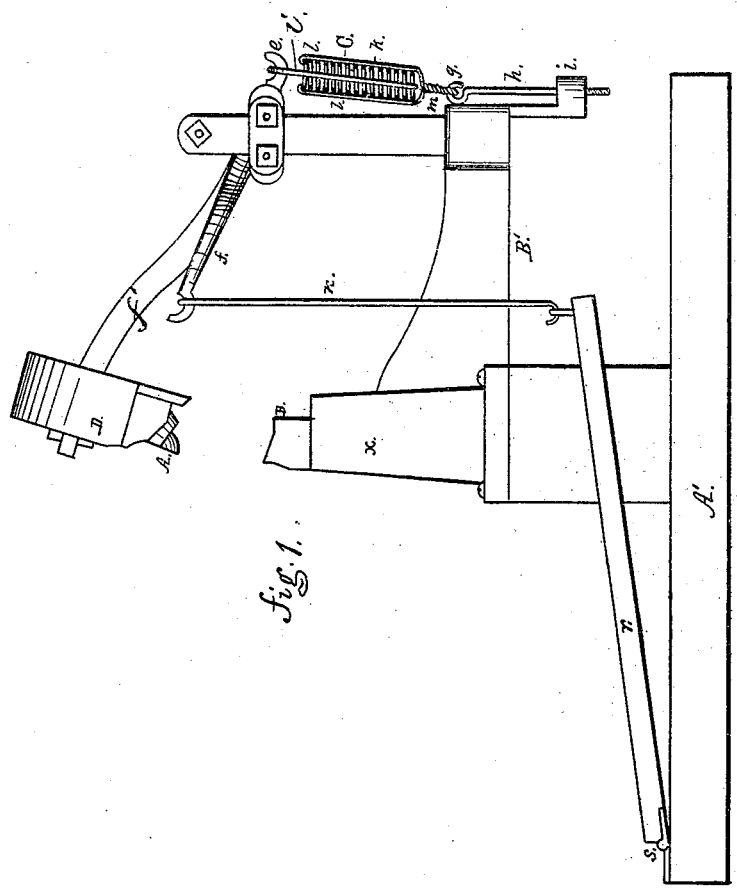
Figure 3:
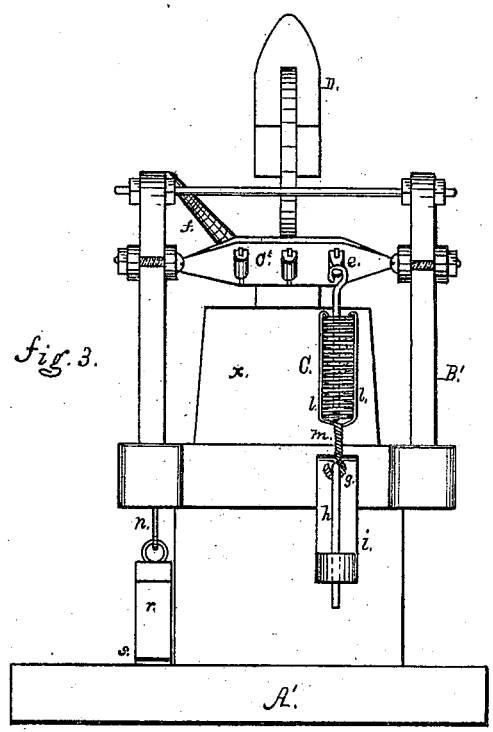
Figure 2:
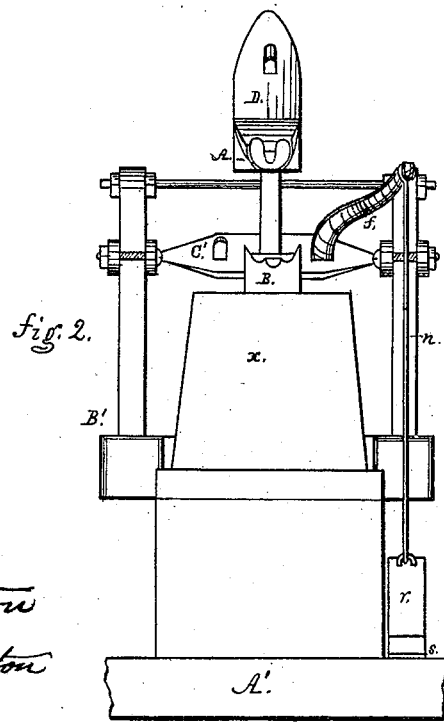

In the accompanying drawings, which form part of my specification, Figure 1 is a side elevation of my improvement in link-welding machines. Fig. 2 is a front elevation of the same. Fig. 3 is a rear end elevation.

Referring to the drawings, A' is the base of the "oliver." B' is a projecting arm, connected with the anvil-block $x$, and supporting a frame-work, to which is pivoted the hammer-arm $f'$. The arm $f'$ at the power end carries the die-block D. To the pivot-shaft C', at one end, is attached a curved lever or arm, $f$, connected, by means of the rod $n$, with the treadle $r$, and at the other end connected to the spring C. The spring is composed of a coil, $k$, inclosed in a cage consisting of three or more rods, $l$, which, at the upper end, hook over the coil, and at the lower end connect with the adjusting-screw $h$, passed through a pendant, $i$. The rods $l$ unite at $m$, and are together connected with the adjusting-screw, as shown at $g$. The rod $l'$, which is attached to the arm $f$ at $e$, is passed down through the coil and hooked to its lower end.

The advantages of this construction of spring consist in this: All parts of the spring are borne upon equally when the machine is in operation, whereas in an ordinary coil-spring the constant traction and retraction to which it is subjected when used with a machine such as here described, causes it to weaken at the ends where the coils begin, and in a very short time they break.

A is the upper die, used for welding chain-links connected with the die-block D. B is the lower die, connected with the anvil-block $x$. By means of the treadle these dies are made to weld together chain-links.

The advantages of combining the link-welding dies with an oliver are speed and efficiency in welding the links.

As the hammer is operated by a treadle both hands of the operator are free to attend to the manipulation of the link.

No particular form of link-welding die is required to be used in connection with this machine. I do not, therefore, give any description, nor claim in this application the dies shown, as I shall hereafter apply for a patent on them exclusively.

Having thus described my invention, what I claim to be new, and desire to secure by Letters Patent, is—

As an improvement in machines for welding chain-links, the combination of the dies A B, arm $f'$, treadle $r$, and spring C, substantially as and for the purpose hereinbefore described and set forth.

J. HENRY HELM.

Witnesses:
JAMES J. JOHNSTON,
A. C. JOHNSTON.